US009089742B2

(12) United States Patent
Vilar et al.

(10) Patent No.: US 9,089,742 B2
(45) Date of Patent: Jul. 28, 2015

(54) METHOD, SYSTEM AND APPARATUS FOR THE AUTOMATIC COLLECTION AND DELIVERY OF SPHERICAL GAME ELEMENTS

(75) Inventors: Javier Simón Vilar, Barcelona (ES); Fernando González Mínguez, Barcelona (ES)

(73) Assignee: Foxtenn Bgreen, S.L., Barcelona (ES)

(*) Notice: Subject to any disclaimer, the term of this patent is extended or adjusted under 35 U.S.C. 154(b) by 156 days.

(21) Appl. No.: 13/521,984

(22) PCT Filed: Jan. 10, 2011

(86) PCT No.: PCT/IB2011/050079
§ 371 (c)(1),
(2), (4) Date: Oct. 25, 2012

(87) PCT Pub. No.: WO2011/086480
PCT Pub. Date: Jul. 21, 2011

(65) Prior Publication Data
US 2013/0210556 A1     Aug. 15, 2013

(30) Foreign Application Priority Data

Jan. 12, 2010 (ES) .................................. 201030018

(51) Int. Cl.
*A63B 69/00* (2006.01)
*A63B 47/02* (2006.01)
*A63B 69/40* (2006.01)

(52) U.S. Cl.
CPC ............ *A63B 47/025* (2013.01); *A63B 47/021* (2013.01); *A63B 69/40* (2013.01); *A63B 2047/022* (2013.01); *A63B 2243/0083* (2013.01)

(58) Field of Classification Search
None
See application file for complete search history.

(56) References Cited

U.S. PATENT DOCUMENTS

| 4,116,436 A | * | 9/1978 | Bjorhn ......................... 473/460 |
| 4,568,089 A | | 2/1986 | Jenkins et al. |

(Continued)

FOREIGN PATENT DOCUMENTS

| DE | 19711298 A1 | 9/1998 |
| WO | WO-2007098537 A1 | 9/2007 |
| WO | WO-2009022929 A2 | 2/2009 |

OTHER PUBLICATIONS

Suzanne Dunphy, Beverage Acquiring Robot, Dec. 11, 2003, Georgia Institute of Technology, pp. 5-19.*

(Continued)

*Primary Examiner* — Tramar Harper
(74) *Attorney, Agent, or Firm* — Honigman Miller Schwartz and Cohn LLP

(57) ABSTRACT

An automatic collection method for collecting one or more spherical game elements that may be struck by a striking element is disclosed. In an implementation, the method comprises acquiring a sequence of images or data from an opto-electric detection system of at least one surveillance area of a gaming area, analyzing at least part of said images or data to detect the presence of at least one spherical game element in said surveillance area, wherein the analysis includes a detection of one or both of a deceleration of the at least one spherical game element or the trajectory of the at least one said spherical game element, including an initial trajectory thereof following a strike to the at least one spherical element by the striking device, wherein the detection determines whether the at least one spherical element is going to remain inside the gaming area or is going to travel outside the gaming area, upon detecting that the at least one spherical element will travel outside the gaming area, moving a collection apparatus for the at least one spherical game element to the location of said at least one spherical game element, and collecting the at least one detected spherical game element.

8 Claims, 1 Drawing Sheet

(56) References Cited

U.S. PATENT DOCUMENTS

| | | | |
|---|---|---|---|
| 7,674,196 B2* | 3/2010 | Tsai | 473/460 |
| 2004/0142766 A1* | 7/2004 | Savarese et al. | 473/353 |
| 2006/0118096 A1 | 6/2006 | Cucjen et al. | |
| 2007/0021226 A1* | 1/2007 | Tyroler | 473/131 |
| 2007/0298898 A1* | 12/2007 | Kiraly | 473/131 |
| 2008/0183347 A1* | 7/2008 | Miki et al. | 701/22 |
| 2008/0262669 A1 | 10/2008 | Smid et al. | |
| 2008/0312010 A1* | 12/2008 | Marty et al. | 473/447 |
| 2009/0067670 A1* | 3/2009 | Johnson et al. | 382/100 |
| 2010/0250024 A1* | 9/2010 | Macedo Ribeiro et al. | 701/2 |

OTHER PUBLICATIONS

International Search Report dated Jul. 18, 2011 relating to International Application No. PCT/IB2011/050079.

\* cited by examiner

METHOD, SYSTEM AND APPARATUS FOR THE AUTOMATIC COLLECTION AND DELIVERY OF SPHERICAL GAME ELEMENTS

FIELD OF THE INVENTION

The present invention relates to a method for the automatic collection and delivery of spherical game elements to a player, such as a ball and in particular a tennis ball, in a field for the practice of said sport.

A second aspect of the invention relates to a system for the implementation of the cited method.

A third aspect of the invention also relates to an apparatus for the automatic collection and delivery of spherical game elements.

The invention method provides a heightened speed of collection and delivery of the spherical game elements, based on the optimized performance of the apparatus for the automatic collection of such elements and particularly from the use of at least two of such apparatuses, operating in a synchronized manner.

For clarity of the following explanation, in the present application the game area will be intended to be that zone of the game surface or game field where the impact or fall of the ball is considered as being valid, according to the rules of the game. Likewise the game surface will be intended to be the game field as a whole including a zone surrounding the cited game area, where mainly ball collection apparatuses will operate.

BACKGROUND OF THE INVENTION

Application WO-A-2009022929 describes an automatic golf ball collection system that can function autonomously or remotely controlled.

It includes an artificial vision system to detect the balls to be collected, and a processing system which processes the images acquired by the artificial vision system, and which individually controls motors which move a collection vehicle, defining a path to be followed according to the detections found in the images. Several operational modalities are proposed with reference to the path to be followed by the collection vehicle e.g. it has to pass along some designated control points or control locations which are previously defined by a positioning system (for example GPS) of the own collection systems. The system provides the installation of a great variety of sensors which allow it to avoid all kind of obstacles and irregularities of the field (since it is intended for outdoor use: in particular for a golf course), as well as to return to the base station if weather conditions are adverse.

DE-A-19711298A discloses a method and a device for the detection and automatic collection of objects, such as tennis balls, with a computing system including an opto-electric detection system comprising one camera, a laser scanner or a sonar sensor that depending on the application even can be combined. The device analyzes the surroundings, it detects the elements to be collected, and it determines the collection trajectory, along which the device can redirect its path to avoid obstacles or to choose an alternative itinerary.

In US-A-20080189004 a vehicle for ball collection in a golf course is disclosed, which follows either one balls collection trajectory or another one based on the information relative to the balls distribution on the field. The information can be acquired by means of a visual sensor located on the vehicle itself or on a remote unit. Its specification indicates that collection of other types of balls can be a performed, such as those for tennis.

In EP-B 0372249 a device to collect tennis balls in an automatic way is proposed, as well as to smooth the playing surface by means of a brush.

In the cited applications possible interaction of the ball collection apparatus or device with the player is unsolved or little developed, whereby the possibility for the device to deliver the game balls or balls to the player and generally the response time is deficient to use the application in a game dynamic without imposing restraints or excessive changes.

The purpose of this invention solves such deficiencies.

Explanation of the Invention

The invention relates to an automatic collection method of spherical game elements, such as a ball and in particular a tennis ball, of the type providing to perform, in an automatic way, the following steps generally known by the cited prior art:

a) acquiring a sequence of images of at least one surveillance area of a game surface, generally comprising any part of the game surface;

b) analyzing said images to detect the presence of at least one spherical game element in said surveillance area; and c) moving a collection apparatus of spherical game elements to the location of said detected spherical game element, which is at least one, and proceed to collect it.

According to the procedure of this invention said step b) includes the detection of at least said spherical game element from the moment in which it is launched by a stroke or hit by the player by means of a stick, paddle or racket, or even before (on the basis of detecting a position and/or movement of the paddle or racket of the player prior to the impact with the ball), during a motion of deceleration, and/or along its path following its launch (both in acceleration and deceleration) so as to determine, as soon as possible, that its impact or fall will take place beyond the determined play area, or of said game surface. Furthermore according to the principles of this invention said step c) begins when, as a result of the analysis of said step b), one confirms that the spherical game element is going to remain inside and/or to exit from said determined game area.

In this way the collector apparatus of spherical elements will start and go towards the collection area brief instants after the launch of the spherical element, and the collection and the subsequent delivery to the player will be carried out in the least possible time.

According to the invention the collection apparatus, which is at least one, also performs the delivery of the spherical element to the player, on request of said player, or in an automatic way (prefixed command by a user), from a collection point, approaching the player up to a determined distance or via an intermediate delivery mechanism selected between a ball launcher machine, a ball storage deposit with auxiliary launcher device and a ball dispenser at a determined height with manual collection by the player, to whom said collection apparatus delivers the ball, and said apparatus returning following said delivery to a given position or starting another collection.

It is also a characteristic of the proposed method that said player request can be performed by means of several communication ways, vocal, gestural, by a wireless device, or by combination of these ones. This particularity allows the method to be applicable to players with different disabilities, elderly people or who require different arrangements, in some way specific for the practice of the game that the method allows to take place.

According to the proposed method the collection apparatus, which is at least one is situated at a game area, close to a game area, or after the spherical element delivery it returns to a game area in which by means of statistical calculations of a game or of a series of games previously played by one or more players, it has been established that a greater number of spherical game elements will impact or fall. This condition leads to greater efficiency of the movement of the collection apparatus, because after the delivery of the ball it will go unless otherwise instructed towards an area more likely for spherical elements to impact or fall, facilitating the collection.

In a preferred embodiment of the invention it provides at least two collection apparatuses, which operate in a complementary manner performing the collection or delivery of the spherical elements and moving in a coordinated and/or synchronous way in order to optimize the delivery time to the player of a spherical element following its collection, said two apparatuses sharing out the collection and/or delivery tasks or moving a first one of said apparatuses towards a predetermined area chosen between one of the cited areas of impact or fall of spherical game elements (which can have been calculated by means of trajectories detection, or statistically provided), while a second apparatus performs a collection or delivery.

Relatively to the method for the automatic collection and delivery of spherical game elements, such as a tennis ball of the present invention, in said step b) it has been provided to analyze the images of any zone of the game surface so as to detect any other objects or people which are present in said area of surveillance, both with reference to their position as well as with reference to the fact that they are still or they are moving, allowing to acquire their movements. Furthermore, this step b) comprises the calculation of the movement trajectory of the ball 11, referred to in step c) as a function of the detected objects and/or of the position of the player with respect to the spherical element at the time of its stroke or hit or prior to it.

By means of the cited strategy it is possible to immediately inform the collection apparatus 14, about the zone in which the ball 11 is going to fall or it is even possible to indicate to said apparatus 14 to perform movements to avoid or to try to avoid a ball 11, in order to maintains a safety distance in case of persons 13, and so that, in any case, it arrives as fast as possible at the location of the spherical game element or ball 11 to be collected.

According to an additional characteristic it has also been provided that in said step b), one proceeds to detect the presence of a plurality of spherical game elements to be collected in said surveillance area, and an optimal itinerary is calculated, in time and distance, for its collection in a shared way by the collection apparatuses which are at least two and which are initially located (when the game begins) at a lateral or end zone of a tennis court, finally performing at the end said step c) to collect all the spherical game elements.

The collection apparatus of the invention is provided to operate in such a way that it delivers the ball by sliding on the game surface, launching it to perform at least a bounce before reaching the player, or throwing it at a determined height depending on the particular characteristics of the player in order to enable the game to be adapted to people with disabilities or physical deficiencies, calculating for this purpose the distance from the delivery point to the player and the receiving conditions. It has also been provided that the collection apparatus approaches a point close to the player so that he can receive the ball practically in the hand.

As indicated the invention also refers to a system for the automatic collection of spherical game elements such as a ball and in particular a tennis ball, of the type that includes:
  some images acquisition means provided to acquire image sequences of at least one area of surveillance;
  a collection apparatus of spherical game elements provided to move and collect spherical game elements, in an automatic way; and
  some control means, in connection with said acquisition and image processing means in communication with said spherical game element collection apparatus, wherein said control means are provided to process at least part of said images to detect the presence of at least one spherical game element in said surveillance area, and to send a control command to said spherical game element collection apparatus so that it moves to the location of said detected spherical game element, which is at least one, and it proceeds to collect it, all according to a structure in part already implemented in various of the cited prior art.

The system of the present invention in addition includes at least two collection apparatuses provided to operate in a complementary and/or synchronized way so as to perform said collection tasks, associated to said control means, and each of said apparatuses is provided to be able to perform a delivery of the collected spherical element to the player, in response to a request from him, said at least two apparatuses operating in a complementary and/or synchronized way during said delivery tasks.

Such apparatuses have small dimensions facilitating the transportation of the system including optional cameras for the surveillance of the playing surface, although already installed cameras on the playing course can be used.

Finally the invention relates to the own characteristics of one of the two used collection apparatuses, advantageously, in the cited system, and which integrate means to interact with a player to perform a controlled delivery to a player of the collected spherical object, or go and collect a determined spherical element, in response to an order given by the same by means of a vocal order, gestural order, electronic device or by means of a combination of these means.

Other characteristics and particularities of the present invention will be apparent with greater clarity in the following detailed explanation of an exemplary embodiment, applied to a tennis court, which is provided as a non-limiting example.

BRIEF EXPLANATION OF THE DRAWINGS

The FIG. 1 is a schematic plan view indicative of a tennis court and with reference to the same various components have been indicated which are necessary to implement a basic version of the invention.

The FIG. 2 is a perspective view of a possible apparatus for the automatic collection and delivery of spherical elements.

DETAILED DESCRIPTION OF AN EXEMPLARY EMBODIMENT

Figure 1:
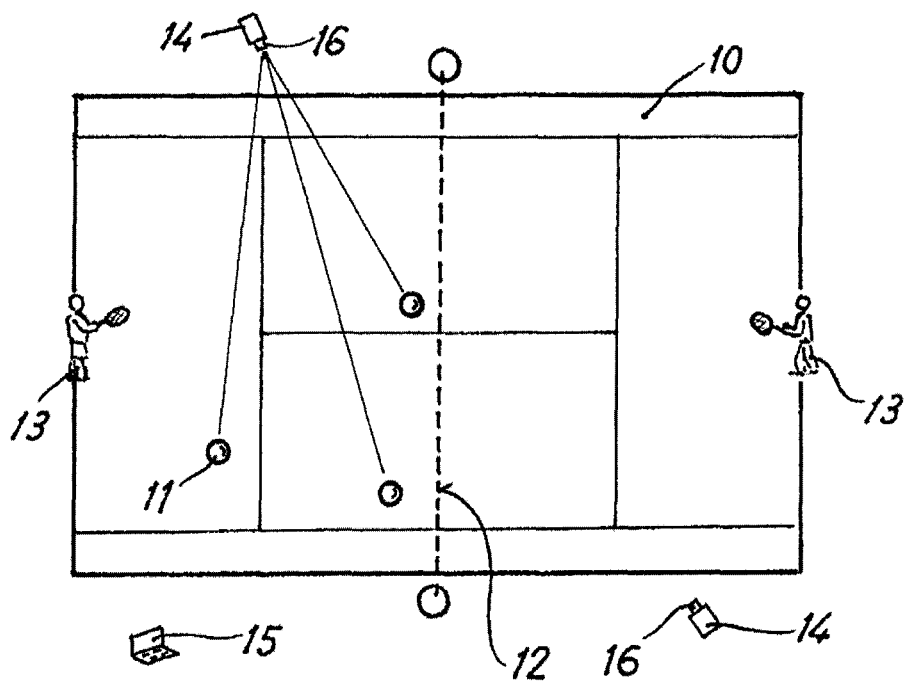

In FIG. 1 a tennis court indicated by reference number 10 can be seen, with an intermediate separation net 12, a plurality of tennis balls 11 being associated to it, which are randomly distributed in the field of one of the players 13. The invention proposes the utilization of a ball collection apparatus 14, preferably using two of such apparatuses 14 arranged in a lateral zone or next to each end or game surface which surrounds the court 10. These apparatuses 14 are remotely controlled (wireless communication, known in itself) by one or more control units 15 (implemented in the present case by a local computer which can be a notebook). In an embodiment of the invention the cited computer can be integrated in one or in both the apparatuses 14. The cited computer or computers receive information concerning the location of the balls 11 from a series of cameras (their position can be diverse located in the sides and/or ends of the game surface or field or even hanging above the game area). A distinctive characteristic of the invention method and system is that said information about the balls 11, not only is a positional information, but it is indicative of the trajectory of the same (and thus it is indicative of a fall or impact zone of the ball 11), and even of the relationship between a part of the player and the ball during the impact of a racket with the same as well as prior to said impact. It is essential that as soon as we can capture an information indicating that a ball can go out of the game area, this information is sent to one of the apparatuses 14, which initiates a movement for its collection and subsequent delivery to the player 13.

Figure 2:
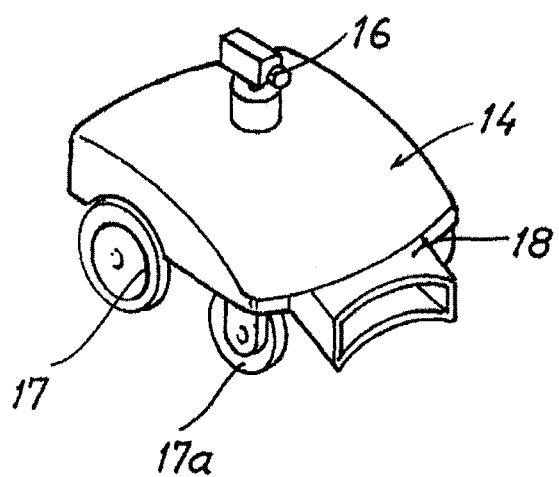

FIG. 2 shows a possible ball collection apparatus 14, in a very basic version, which in the present invention includes a device provided with some driving wheels 17 and steering wheels 17a, provided with a front portion 18 intended to embrace and retain a ball, E.g. via suction through some slits, although other known systems can be used (pair of adjacent rotating rollers, rotating brushes, etc.).

The apparatus 14 is equipped with at least a camera 16 provided for inspection of the game field or surface, of the player and his gestures or other people and their means of interaction, or others objects which are present at a given time in the game surface, and able to provide additional information to a control unit 15 about the location of the balls 11 to be collected.

In the particularly case in which the ball impacts the net and it remains attached to it, the collection apparatus 14 have been provided to have some specific actuation means in that area going to the point where the ball is located and shaking the net or capturing the ball 11 E.g. with some means of grabs.

In the case of the collection apparatus 14 represented in FIG. 2, as a mere and hence non limitative example, the delivery of the ball will occur by sliding on the game surface, striking it by means of a throwing or launching element associated to the collection head.

It has also been provided that the apparatus 14 can deliver the ball in an automatic way, from some prefixed positions, E.g. next to the player, following an established command from the player or it can also approach said player and it only delivers the ball 11 following his request.

The illustrated apparatus 14 or another similar one (with adaptations to transfer and manipulate the balls) can also deliver the ball 11 to an intermediate device (not represented) which will launch it to realize at least one bounce before reaching the player, or will throw it at a determined height according to the particular player characteristics in order to be adapt to people with disabilities or physical deficiencies, calculating for this purpose the distance from the delivery point to the player of and receiving conditions. As indicated the apparatus can provide a delivery approaching the player, and giving him the ball in his hand.

The apparatus 14 for the automatic collection of balls 11 is provided to move by means of its wheels 17, 17a, towards a zone wherein the control means 15, in connection with said image acquisition means have detected the presence of at least one ball 11, or that said zone is going to receive the impact or fall of a ball 11, given its trajectory. For this purpose the apparatus 14 is provided with some self-powered means such as a rechargeable battery.

The apparatus 14 includes means to interact with a player (luminous, acoustic signals, etc. and to receive commands: acoustic sensors, camera 16, etc.) to perform a controlled delivery of the collected spherical object to a player, or to go to find a determined spherical object, in response to a command given by said player, by means of a vocal, gestural command, an electronic device or a combination of said means.

In particular the means by which the apparatus 14 interacts with a user include a recognition system of the speech, of gesture commands, or of luminous or wave signals, able to interpret verbal or gestural commands, or signals emitted by said user as control commands and an audio system has been provided in the apparatus to emit sounds and/or phrases and/or music selectable by means of said control means depending on the operating status of the apparatus.

In this way the apparatus 14 goes towards the ball 11 as quickly as possible, once it has reached the ball it proceeds with its collection and it places it in a delivery or throwing position. At this point the player 13 can decide if he wants the apparatus 14 to pass him the ball 11 and to return to a determined point or base, or if he wants it to go to said base and wait for a request for a ball 11, from the player 13.

The apparatus 14 can be equipped with some brushes to perform auxiliary tasks such as cleaning an area of the court, as well as with elements to mark some lines delimiting the different zones of the game area.

With reference to the system to implement the invention, the same is mainly characterized in that it includes at least two collection apparatuses 14 provided to operate in a complementary and/or synchronized way to perform said collection and/or delivery tasks, associated to said means of control each of said apparatuses 14 is provided to be able to perform a delivery of the collected ball 11 to the player, in response to a request thereof, said at least two apparatuses operating in a complementary and/or synchronized way during said collection and delivery tasks.

Instead of providing the apparatus 14 to deliver a previously collected ball 11 to the player in response to a request by said player, it has being provided that the player can determine by means of a previously established command, the apparatus 14 to automatically operate delivering the balls 11, to the player, after their collection, e.g. from a predetermined launch point, as long as the player does not establish for it to returned to a delivery of the ball on request.

The provided collection apparatuses 14 integrate, as shown in FIG. 2, at least one image acquisition device, selected from a CCD camera, a video camera or another image capturing device, known by itself, and because there is an intercommunication between said collection apparatuses which are at least two, to cover, in a complementary way different areas of the game surface or hidden areas for one of the two cameras, with the contribution of said control means.

For a proper implementation of the described method the use of at least one fixed camera (not represented, since its position can be very different) which serves said game surface has also been provided, said control means 15 receiving visual information from said mobile cameras 16 fixed to the collection apparatuses 14 and from said fixed camera, which is at least one. In a preferred embodiment one or more additional rotating head cameras (not represented) have been also provided, intended to follow the player to acquire his movements, providing different angles and allowing the capture of images of different players on the court, or areas where the ball bounces, etc. Advantageously two such rotating head cameras will be used, one for each player.

The control means comprise a first electronic system (located in local control units 15) separate from the balls 11 collecting apparatus 14 and a second electronic system carried by said apparatus 14, both electronic systems communicating the one with the other by means of a wireless communication. As indicated, said control means could be integrated in an alternative embodiment, as a whole, in the collection apparatuses 14 themselves without the need for a separate local unit. Generally, at least one of said electronic systems will include a memory to register some historical data relative to the operation of the system as whole, including images and statistical information. In this way all the apparatuses 14 and all the vision devices (mobile and fixed cameras) are programmable and can dump all the statistical information and images of their activity.

It has likewise been provided the invention system to be arranged as a portable set, integrating transport means of its components. The system can use previously installed cameras for its implementation in a tennis court, for transmission of the matches or training studies.

The invention claimed is:

1. An automatic collection method for collecting one or more spherical game elements that may be struck by a striking element, the method comprising:
    acquiring a sequence of images, using an image acquisition system, or detection data, using an opto-electric detection system, of at least one surveillance area of a gaming area;
    automatically analyzing, by performing image or data processing using control means, at least part of said images or data to detect the presence of at least one spherical game element in said surveillance area, wherein the analysis includes:
        an automatic detection of one or both of a deceleration of the at least one spherical game element or of the trajectory of the at least one said spherical game element, including an initial trajectory thereof following a strike to the at least one spherical element by the striking device, and
        automatically determining, based on the result of said detection of a deceleration or trajectory of the at least one said spherical game element, whether the at least one spherical element is going to remain inside the gaming area or is going to travel outside the gaming area; and when said automatic determining gives as a result that the at least one spherical element is going to travel outside the gaming area:
    sending control commands from said control means to a mobile collection apparatus;
    said mobile collection apparatus, upon the reception of said control commands, automatically moving to the location of said at least one spherical game element and automatically collecting the at least one detected spherical game element.

2. An automatic collection method as set forth in claim 1, further comprising the step of:
    automatically delivering one of the at least one spherical elements to a position within the gaming area with the mobile collection apparatus or with an auxiliary apparatus which is separate from the mobile collection apparatus.

3. An automatic collection method according to claim 2, wherein said automatic delivering step is triggered upon the mobile collection apparatus or the auxiliary apparatus receives a manual command request, an automatic wireless command request, a signaling device command request, or a combination thereof.

4. An automatic collection method as set forth in claim 2, wherein automatic delivering step comprises:
    launching, with the mobile collection apparatus or with said auxiliary apparatus, one of the at least one spherical element to a pre-determined height and to a predetermined location such that the one of the at least one spherical element bounces.

5. An automatic collection method according to claim 1, comprising placing the mobile collection apparatus in the gaming area, close to the gaming area, or, after the spherical element automatic delivery has occurred, moving the mobile collection apparatus to a target gaming area where the result of automatic statistical calculations regarding a game or a series of games previously played by one or more players has established that a greater number of spherical game elements will impact or fall.

6. An automatic collection method as set forth in claim 1, wherein the method comprises using said control means for controlling the operation of at least two collection apparatuses by sending control commands from said control means to said at least two mobile collection apparatus for:
    making the at least two collection apparatuses automatically operate in one or both of a complementary and synchronized way;
    automatically making the at least two collection apparatuses to perform the collection or delivery of the at least one spherical element;
    automatically moving the at least two collection apparatuses in one or both of a coordinated and synchronous way;
    automatically optimizing the delivery time for the delivery to a player of a spherical element, following a previous automatic collection of said spherical element; and
    automatically moving a first one of said at least two collection apparatuses towards a collection zone while substantially contemporaneously automatically moving a second one of said at least two collection apparatuses to automatically perform a collection or delivery of one of the at least one spherical elements, wherein the collection of a spherical element is automatically calculated, by the control means, using the automatically detected trajectory of the spherical element or statistically.

7. An automatic collection method as set forth in claim 6, wherein the automatic detecting step performed by the control means, further comprises:
    automatically detecting the presence of a plurality of spherical game elements to be collected in said surveillance area; and
    automatically calculating the image or data processing carried out by an optimal itinerary, in time and distance, for collecting the plurality of spherical game elements by said at least two collection apparatuses.

8. An automatic collection method as set forth in claim 1, wherein the step of automatically analyzing includes the following steps, performed by said image or data processing carried out by said control means:
    automatically detecting objects in said surveillance area to determine location and velocity thereof;
    sending control commands from the control means to the collection apparatus, to make the latter move avoiding the detected objects and maintaining a safe distance therefrom but arriving to the location of a spherical game element having a foreseen area of impact.

* * * * *